(12) United States Patent
Zistler

(10) Patent No.: US 11,812,207 B2
(45) Date of Patent: Nov. 7, 2023

(54) METHOD AND SYSTEM FOR REMOTE MONITORING OF PLANTS AND IN PARTICULAR PLANTS FOR THE BEVERAGE PRODUCTION INDUSTRY

(71) Applicant: KRONES AG, Neutraubling (DE)

(72) Inventor: Johann Zistler, Kelheim (DE)

(73) Assignee: KRONES AG, Neutraubling (DE)

( * ) Notice: Subject to any disclaimer, the term of this patent is extended or adjusted under 35 U.S.C. 154(b) by 896 days.

(21) Appl. No.: 16/313,916

(22) PCT Filed: Aug. 28, 2017

(86) PCT No.: PCT/EP2017/071564
§ 371 (c)(1),
(2) Date: May 9, 2019

(87) PCT Pub. No.: WO2018/037133
PCT Pub. Date: Mar. 1, 2018

(65) Prior Publication Data
US 2022/0060805 A1  Feb. 24, 2022

(30) Foreign Application Priority Data
Aug. 26, 2016  (DE) ................... 10 2016 115 969.7

(51) Int. Cl.
*H04Q 9/00* (2006.01)
*G05B 23/02* (2006.01)
(52) U.S. Cl.
CPC ........... *H04Q 9/00* (2013.01); *G05B 23/0213* (2013.01)

(58) Field of Classification Search
CPC .. H04Q 9/00; H04Q 2209/00; H04Q 2209/10; H04Q 2209/30; H04Q 2209/40;
(Continued)

(56) References Cited

U.S. PATENT DOCUMENTS 6,973,491 B1 * 12/2005 Staveley ............. H04L 41/0253
709/223
7,019,638 B1  3/2006 Wallace
(Continued)

FOREIGN PATENT DOCUMENTS

CN  1722065 A  1/2006
CN  101467173 A  6/2009
(Continued)

OTHER PUBLICATIONS

International Search Report for PCT/EP2017/071564.
(Continued)

*Primary Examiner* — Franklin D Balseca
(74) *Attorney, Agent, or Firm* — Schmeiser, Olsen & Watts, LLP

(57) ABSTRACT

Provided is a method for remote monitoring of a production plant and in particular a packaging plant, the plant has a plurality of working units as well as a data collection device, to which these working units are connected at least partially and/or at least intermittently for data transmission, wherein the data collection device collects relevant data for the working units and wherein a data transmission device transmits data from the data collection device to a data recording device, wherein at least one characteristic and in particular a type and/or a scope of the data to be transmitted can be determined by a user and in particular by a user of the data collection device.

19 Claims, 2 Drawing Sheets

(58) Field of Classification Search
CPC ........... H04Q 2209/70; H04Q 2209/80; H04Q 2209/826; G05B 23/00; G05B 23/02; G05B 23/0213
See application file for complete search history.

(56) References Cited

U.S. PATENT DOCUMENTS

| | | | |
|---|---|---|---|
| 9,680,969 B2 * | 6/2017 | Kuroiwa | .................. H04L 69/04 |
| 9,730,621 B2 * | 8/2017 | Cohen | .................. A61B 5/1495 |
| 9,980,646 B2 * | 5/2018 | Mensinger | ........... A61B 5/0004 |
| 2001/0049639 A1 | 12/2001 | Sapin-Lignieres | |
| 2002/0032517 A1 | 3/2002 | Buckelew et al. | |
| 2002/0116080 A1 | 8/2002 | Birnback et al. | |
| 2015/0316904 A1 * | 11/2015 | Govindaraj | ........ G05B 13/0205 |
| | | | 700/28 |

FOREIGN PATENT DOCUMENTS

| | | |
|---|---|---|
| CN | 101881656 A | 11/2010 |
| CN | 102216199 A | 10/2011 |
| CN | 102482069 A | 5/2012 |
| CN | 102523103 A | 6/2012 |
| CN | 104079877 A | 10/2014 |
| CN | 104635691 A | 5/2015 |
| DE | 10 2006 044 869 A1 | 4/2007 |
| DE | 10 2010 044 500 A1 | 3/2012 |
| JP | H08249054 A | 9/1996 |
| WO | WO-9720447 A1 * | 6/1997 ............... H04Q 9/00 |

OTHER PUBLICATIONS

Patrik Spiess et al: "SOA-Based 1-12 Integration of the Internet of Things in Enterprise Services", Web Services. 2009. ICWS 2009. IEEE International Conference On. IEEE. Piscataway. NJ. USA. Jul. 6, 2009 (Jul. 6, 2009). pp. 968-975.

Chinese Office Action dated Dec. 16, 2020 for Application No. 2017800409937.

Chinese Office Action dated Jul. 20, 2021 for Application No. 2017800409937.

* cited by examiner

METHOD AND SYSTEM FOR REMOTE MONITORING OF PLANTS AND IN PARTICULAR PLANTS FOR THE BEVERAGE PRODUCTION INDUSTRY

CROSS-REFERENCE TO RELATED APPLICATIONS

This application claims priority to PCT Application No. PCT/EP2017/071564, having a filing date of Aug. 28, 2017 based off German Application No. 10 2016 115 969.7, having a filing date of Aug. 26, 2016, the entire contents of both of which are hereby incorporated by reference.

FIELD OF TECHNOLOGY

The following relates to a method and system for remote monitoring of plants and in particular plants for producing beverage containers.

BACKGROUND

It has been known for a relatively long time from the known art that plants are monitored remotely, for example by the machine manufacturer, in order in this way to be able to react quickly to faults and to be able to give the customer instructions as precisely and quickly as possible. In this case it is known that machine data are read out and evaluated by a member of the manufacturer's staff via a data link, for example an internet connection. However, in this case the cost of the evaluation of each individual machine is relatively high and inconvenient. In addition, basically all of the machine-relevant data are read out and passed on to the manufacturer. In some instances, this is also undesirable for the operators of the respective systems. Thus, for example it is conceivable that the plant operators do not want any data to be published which allow a conclusion to be drawn with regard to an output capacity or a recipe.

SUMMARY

An aspect of embodiments of the present invention is to reduce the cost of such remote monitoring. It should also take better account of the safety and confidentiality requirements of different customers.

In a method according to embodiments of the invention for remote monitoring of a production plant, in particular a packaging plant and in particular a plant of the beverage production industry, the plant has a plurality of working units as well as a data collection device, to which these working units are connected at least partially and/or at least intermittently for data transmission, wherein the data collection device collects data relevant for the working units. Furthermore, a data transmission device is provided, which transmits data from the data collection device to a data recording device.

According to embodiments of the invention, different amounts of these data are transmitted to different receivers and a user can determine at least partially which data are transmitted to which receiver. Thus, whereas in the known art all data are transmitted to the same receiver, for instance the machine manufacturer, in the context of embodiments of the invention it is proposed that a specific amount of the data is transmitted to a first receiver, for example a user or operator of the plant, or to a corresponding receiving device in the region of the user of the plant, and another amount of the data is transmitted to a second receiver, for instance a manufacturer of the plant or a corresponding receiving device in the region of the machine manufacturer. It would also be possible for a specific amount of data to be transmitted both to the operator of the plant and also to the manufacturer. These respectively different amounts can be determined by a user of the plant.

This may involve completely free determinability, but it may also be provided that, only with regard to a specific amount of the data, the machine user can determine to whom these data should be transmitted. Thus, it may be provided that a specific amount of data is always transmitted for instance to the machine manufacturer. The user is in particular a user of the plant or the machine operator. However, it would also be possible for the determination to take place by the manufacturer or a third party.

In this case the data recording device can be provided at different locations. Thus, it is possible for the data recording device to be situated at the location of the machine manufacturer. In this case the data are transmitted wirelessly from the data collection device to the data recording device. In this case the data transmission device is a remote data transmission device. In addition, however, it would also be conceivable that the data recording device is situated at the location of the machine to be operated, that is to say in particular in the sphere of the machine operator. In this case the data also cannot be transmitted wirelessly from the data collection device to the data recording device. In this case it would also be possible that the data collection device and the data recording device are designed as a structural unit. Here, in the simplest case, the data transmission device could be formed as an interface between the data collection device and the data recording device.

The data recording device could also be situated at a further location, for instance the location of a central server from which a plurality of plants can be monitored. The data recording device could also be configured as a central data recording device, which records the data of a plurality of plants and/or plant parts.

The decision concerning the location of this data recording device can depend upon who should ultimately take the decision as to which data should be handled in which manner. If this is to be done by the machine operator, the data recording device will be situated at the location of the machine to be operated. For instance, if the machine manufacturer is to be able to make this decision, the data recording device will be situated at the location of the manufacturer.

The data transmission device and/or the data collection device could also be configured as a data selector device and/or can have such a data selector device, that is to say a device which serves not only for transmitting data, but which already makes a selection of the data to be transmitted. It would also be possible that such data selector devices are provided at a plurality of locations and so such data selections can be made at a plurality of locations. In this case a reconciliation between these input data could be carried out. If these presets correspond, they could be adopted, and if the presets do not correspond, proposals for the handling of the data could be presented automatically.

The data are transmitted to at least two different receivers, to precisely two different receivers. In a further preferred method, it is also possible for the data to be transmitted in a chronologically staggered manner to the two different receivers.

Therefore, the user can determine rules which specify which data are transmitted to which receiver.

These data can be for example raw data, such as for instance measured data, but also data derived therefrom, for example values calculated from these data. Thus, it is possible that the data collection device collects raw data and from these data derives further data and these derived data are transmitted to the respective receivers.

At least one characteristic and in particular a type and/or a scope of the data to be transmitted can be determined, in particular, by a user of the data collection device and/or the data recording device. For this purpose, for example, a data selector input device can be provided, by means of which the user can input the type and the scope of data to be transmitted.

The data can be, for example, raw data, which are recorded directly by corresponding sensors, such as for example data which are characteristic for occurring vibrations. In addition, they can be data from a continuous condition monitoring.

In addition, it is possible that an extraction of recorded data is already carried out (for example by the data collection device), that is to say for example a conclusion is reached concerning the relevance for the machine operation (low, medium, high).

Thus, it is proposed according to embodiments of the invention that not all the data are transmitted—as is usual in the known art—but the users can make a preselection as to which data should actually be transmitted and, in particular, to which receiver which data are transmitted. In this way, on the one hand, the cost for monitoring of the machine can be kept lower and, on the other hand, an interest in safety or confidentiality on the part of the user can also be taken into account. One receiver is situated in an (in particular geographical) region of the plant to be monitored, and the other receiver is situated remote therefrom.

Furthermore, it would also be possible that specific data are filtered out from a data set and the data remaining after the filter are transmitted to one of the two receivers, and the data filtered out are transmitted to the other one of the two receivers.

Thus, the working units or machines are situated in an internal network and are (locally) connected to a data collection device, also designated below as a "connect box". Therefore, a data communication connection between the data collection device and the data recording device exists at least intermittently and only intermittently.

This data collection device or connect box retrieves the machine data—in a time interval—Xin the (internal) network and evaluates them. Depending upon the result of the evaluation, the reaction may be different. Thus, for example, it is possible that the data are forwarded to a central unit (in particular the data recording device), and it is possible to store these data (in particular locally) or to inform the machine operator or customer on site about this. A central unit can contain data from a plurality of connect boxes (or data collection devices). This central unit—also designated above as a data recording device—can in turn decide how these data are to be further handled and these data can then be transmitted, for example, to a machine manufacturer.

In a preferred method it is also possible that locally stored data are retrieved again at another time. The data collection device can be operated under different operating conditions. Thus, for example, the user can predetermine how the data collection device handles specific data.

Furthermore, it is also possible that the data collection device communicates with different controllers and so for instance collects data from different control devices.

In a further advantageous method archive copies or backups are created at least intermittently. Data such as machine parameters, in particular those which are used for the ongoing operation, can for example be stored in these backups. In addition, in the context of these backups, data can be collected, which are characteristic for instance for malfunctions of the machine operation, or data which relate to the product to be treated. For this purpose, the plant can for example have a storage device which is suitable and intended for storing these data. In this case such a backup can be created at predetermined intervals and in particular at regular intervals. In such backups it can also be logged which changes have been made to parameters by which machine user or machine operator. Furthermore, protocols concerning the machine operation can also be created.

Thus, at least one evaluation of the data takes place automatically. In this case it is possible that only information relevant for the operation of the machine is passed on to the machine manufacturer. Furthermore, it is also possible that, if required, all the data can be retrieved.

The data are classified or grouped with regard to their relevance or importance for the operation of the machine. The classification takes place taking account of a malfunction to be expected with regard to these data. Thus, for example, data which suggest a serious or imminent failure of the plant can be assigned to different group from data which for instance suggest advanced wear of a specific machine element or contamination of the machine element.

The working units are working units which handle a specific product, such as for instance a container, in successive steps, for example a transforming device which forms plastic bottles from plastic parisons, a filling device which fills these bottles with a liquid and, finally, a labelling device which provides the filled bottles with labels.

The individual plant parts or working units each have controllers. In addition, a central control device is provided which also controls all the working units in relation to one another.

In a further preferred method, the data are repeatedly collected or are collected at predetermined times and/or time windows.

In a further preferred method, the data collection device communicates only partially and/or only intermittently with the data recording device or only passes on some data. In this method it is already decided in the region of the data collection device which data are passed on to the data recording device. In addition, however, it would also be possible that all the data of the data collection device are transmitted to the data recording device, and this decides how to proceed with the data. Thus, it would be possible that individual data are transmitted back to the customers and other data are transmitted for example to the machine manufacturer.

The data transmission device is suitable and intended for only intermittent transmission of data. In a further preferred method, the transmission of the data from the data collection device to the data recording device takes place via the internet. The transmission of the data takes place via a secure connection, for example a so-called VPN line. Furthermore, it is also possible that the data transmission device is a component of the data collection device.

The individual working units or machines are connected via an internal network. This network detects only those working units or machines which are at a specific location. The data collection device or connect box which is connected to the machines via this network is situated at this location. The connect box processes the data from the individual working units and decides how to proceed with them. A plurality of connect boxes can be connected to a central unit of the above-mentioned data recording device by a data line and in particular a temporary VPN tunnel. These data collection devices only communicate with the central unit if it is necessary, i.e. a controlled communication is carried out.

The central unit or the data recording device then decides how to handle the information from these data collection devices.

In a further preferred embodiment, the data transmission device merely transmits a partial amount of the recorded data. This means that already at the level of the data collection device it is decided which data are passed on to the data recording device and which are not. However, it would also be possible that the data recording device merely outputs a partial amount of the data to the machine manufacturer. However, this partial amount can preferably be configured by the user. This means that the user can freely decide which data are output to the machine manufacturer and which are not. It would also be possible that the data transmission device transmits all the data to the data recording device and only at the level of the data recording device it is decided which data are transmitted to which receiver.

In other words, a level of the output of data is freely configurable. Thus, in the extreme case it would even be possible that no data are output to the machine manufacturer or in another extreme case all the data are output to the machine manufacturer. In this way the safety interests of the plant operator can be taken into account. Thus, it is possible to configure which data are output to which user or users. Thus, it would be possible, for example, that only data which suggest a serious fault, or an impending failure of the plant are output to the machine manufacturer, so that the manufacturer can quickly react remotely. It would also be possible that the machine manufacturer is notified about repeatedly occurring faults during operation of the plant, in order thus to be able to initiate a correct countermeasure or to be able to instruct the customer about a possible fault correction.

However, it would also be possible that the configuration even changes automatically in the course of time. Thus, for example it is possible that the customer wishes that, in the event of specific faults occurring, after he has learnt of a possibility for correcting the fault, this is no longer passed on to the manufacturer, but he can correct this fault automatically. The data collection device is a computer unit, in which an amount of storage, a type of compression and/or a time interval for the transmission can be set. A rules and alert management are provided. This means that data input in the data collection device are classified differently with regard to their relevance (for operation of the machine or the plant).

The data collection device is intended to take over data from the individual working units. In this case these data are selected from a group of data which contains raw data, aggregated data, data safeguards, backups, logfiles and fault messages. In this case the collecting device picks up these data with configurable parameters from the working units or these data are transmitted to the data collection device. In this case, for example, the time intervals in which the data are picked up can be set, and furthermore the quantities of data can be configured and possibly it is also possible to configure whether and in what way the respective data are changed.

Furthermore, the data collection device evaluates the data thus collected, wherein here too a rules management can be used. These data are stored temporarily and/or locally. The individual rules can lead to alerts. It would also be possible for specific data to be associated with specific alerts. With regard to these alerts it can be decided which receiver they are passed on to. In this case it is possible for occurring alerts to be divided into different alert stages. Thus, for example the evaluated rules can be divided into different alerts. Depending upon an alert stage, different actions are carried out for the data.

In this case, for example, the following prioritisation can be performed. As a first priority the alert is passed on to the data recording device. This can, for example, relate to critical alert situations, in which a direct intervention by the manufacturer should be carried out. In a second priority a corresponding alert is transmitted to the customers. Where appropriate the customer can react to these alerts. Furthermore, can be in this priority stage, alerts controlled in terms of escalation and time are passed on to the central detection unit. These may be, for example, alerts with medium priority.

Within the context of a third or lowest escalation stage, an alert is only processed internally by the customer.

If the data are to be transmitted to the detection unit, first of all a secure connection, such as in particular a VPN tunnel, is established. This takes place through the data collection device and/or the data transmission device. Only if such a secured connection exists can the data collection device have a connection to the detection device. In this case, this establishment of the secured data connection is also in turn controllable by definable parameters and by freely definable parameters. These parameters may be for example time intervals, quantities of data and file types and also compressions and the like.

In a further preferred method, the detection device (but also, where appropriate, the data collection device) then decides about the further procedure and/or the processing of the incoming data. Thus, for example, alerts, tickets or archiving can be initiated. In a further preferred method, the central unit or the detection device receives the data alerts transmitted or sent by the collecting device.

In a further preferred method at least one amount of collected data is data from at least one working unit measured by measuring devices. Thus, it is possible that such data are measured in particular during operation. Furthermore, the data can also be long-term data, which in particular can be output, filtered, to the data recording device or also to the machine manufacturer. Thus, in a further preferred method measuring devices are provided which carry out measurements in particular during operation. In addition, the long-term data can also be time data.

In a further preferred method, the plant is arranged at a first geographical location and the data recording device is at a second geographical location which is different from the first geographical location. In this way the relevant plant can be maintained remotely or checked remotely.

An amount of data is output here at the first geographical location, i.e. at the location at which the plant is situated. An amount of data is also output to a second geographical location. Thus, for example it may be possible that such alerts, to which the user himself wishes to react immediately, are output at the first geographical location.

In a further preferred method, the data are selected from a group of data which contains raw data, aggregated data, data safeguards, backups, logfiles, fault messages, and alerts and the like determined from the data.

In a further preferred method at least one working unit is selected from a group of working units which includes transforming devices for transforming plastic parisons into plastic containers, heating devices for heating plastic parisons, sterilising devices for sterilising plastic parisons or plastic bottles, filling devices for filling containers, labelling devices for labelling containers, closing devices for closing containers and the like.

The plant is advantageously such a plant which successively processes a specific product, such as for example plastic bottles. Thus, for example the first plant unit or working unit can be a blow moulding machine which produces plastic bottles from plastic parisons. This can be followed by a second working unit in the form of a filling machine, which fills the plastic containers thus produced with a liquid and in particular a beverage. This working unit in turn can be followed by a closure device or a labelling device and/or a printing device which provides the containers with printing.

In a further preferred method only, specific data are transmitted from the remote data transmission device to the data recording device and/or only specific data are further processed by the data recording device. Also, in the context of this further processing a decision can be made as to the receiver or receivers to which the respective data, or information such as for instance alerts resulting from these data, are forwarded. Furthermore, it is also possible that the remote data transmission device is a component of the data collection device.

In a further preferred method specific data are output at the location of the plant to a user or receiver. For this purpose, the plant can have an information output device, by means of which alerts and the like can be output for example to the user.

As mentioned above, the data recording device or the data collection device can decide, which data are further processed in which way. In this case an analysis of the data by a manufacturer can also take place according to his presets.

Furthermore, embodiments of the present invention are directed to a system for remote monitoring of a production plant and in particular a packaging plant. In this case the plant has a plurality of working units as well as a data collection device, to which these working units are connected at least partially and/or at least intermittently for data transmission, wherein the data collection device is suitable and intended to collect data relevant for the working units. Furthermore, the system has a remote data transmission device to transmit data from the data collection device wirelessly to a data recording device.

According to embodiments of the invention different amounts of these data can be transmitted to different receivers and a user can determine at least partially which data are transmitted to which receiver.

At least one characteristic and in particular a type and/or a scope of the data to be transmitted can be determined by a user and in particular by a user of the data collection device.

Therefore, with regard to the system it is also proposed that a user can select which data are further processed in which manner and, in particular, to which receiver or receivers these data are transmitted. In a further advantageous embodiment, the data recording device decides upon further processing of the respective data. In a further preferred embodiment, it would also be possible that the data collection device decides about these data or the further processing thereof.

In a further advantageous embodiment, the system has a data grouping device by which incoming data at the data collection device are allocated to different groups of data. In this case is preferred an analysis device is provided, which analyses the incoming data as to whether these data are based on conditions of the working units which can give rise to a specific fault of the plant. These different data groups can be transmitted to different receivers.

In a further advantageous embodiment there is an intermittent communication connection between the data collection device and the data recording device.

In a further advantageous embodiment, the system has a plurality of measuring devices to measure characteristic values of the working units. These can be for example speed values, pressure values, temperature values and the like.

The embodiments will now be explained with reference to an actual example. If malfunctions occur in a machine located at the customer's facility (for example faults, malfunctions or other messages), these are saved in a discrete logfile or a storage device. The data collection device which—as mentioned above—is situated locally in the customer's network then collects these data (data information) from the machine and these are evaluated. In addition, current or historical conditions can also be collected.

In the evaluation a pattern is then sought to increase the productivity and to detect interrelated situations.

In this case it is also possible to observe pre-defined rules which can be established by the customer or user. In this case these rules can determine which data are transmitted to which receiver and/or which data are released for which receiver.

The rules described above take effect in the result of the evaluated data. Should a specific rule apply in the evaluation, the appropriate contact person is informed by means of the alert management. This may be for example the machine operator or also the machine manufacturer. This can then react in each case individually to the corresponding message, the alert and the like.

The detection device collects the evaluated data from the at least one data collection device and from the plurality of data collection devices which are also situated at different locations. This can take place—as mentioned above—through a VPN tunnel which is temporarily established only at one port. As soon as the data have been transmitted the corresponding tunnel can be disconnected again.

In the central unit the data are further processed depending upon the evaluation.

The alert management can have a graphical user interface (GUI). These can be constructed on the modular principle. In this case it is possible to predefine or to add new rules and for example by means of drag-and-drop to assign them to the respective machine or to a customer and/or to activate them.

Furthermore, it is possible that existing alerts are processed or removed. It would also be possible to shift or to change the above-mentioned priorities for specific alerts. Furthermore, the described alert management can be used by the manufacturer's staff, wherein for this purpose a discrete data management can be used. If new rules are drawn up, it is also possible to decide to which machine or component these rules are applied.

BRIEF DESCRIPTION

Some of the embodiments will be described in detail, with references to the following Figures, wherein like designations denote like members, wherein.

DETAILED DESCRIPTION

Figure 1:
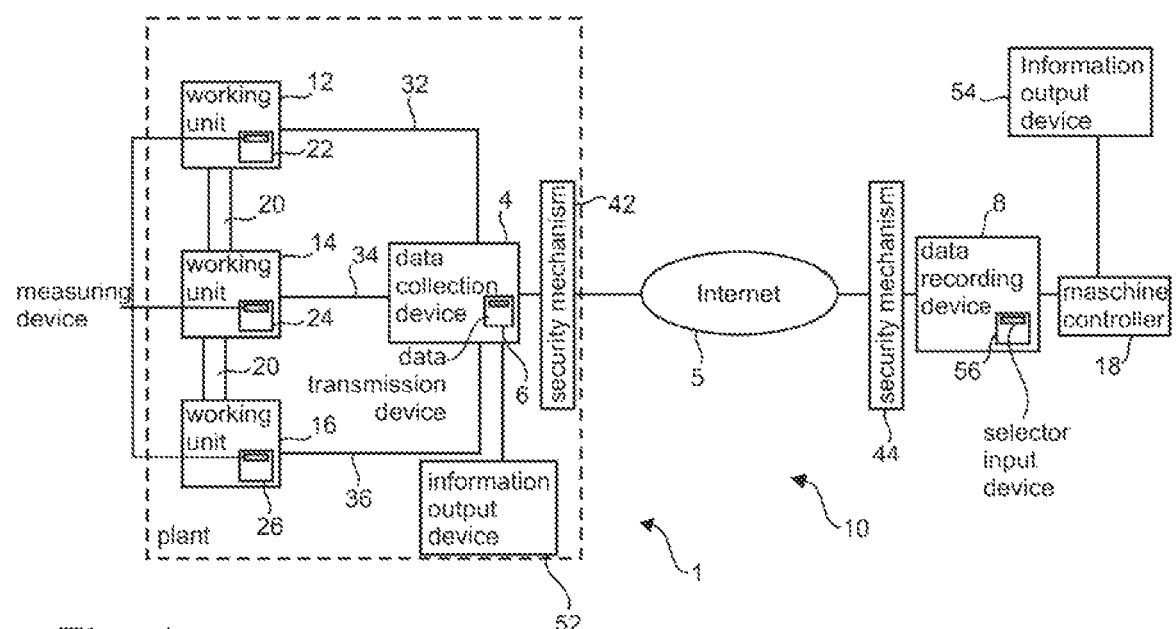
FIG. 1 shows a representation of a plant according to embodiments of the invention.

FIG. 1 shows a schematic representation of a system 10 according to embodiments of the invention for remote monitoring of a plant 1. This plant 1 has three working units 12, 14 and 16 which serve for handling containers. More precisely, the containers here are processed successively by the working unit 12, then by the working unit 14 and finally the working unit 16. Thus, for example the working unit 12 can be a blow moulding machine which transforms plastic parisons into plastic containers 14. A sterilising device which sterilises the plastic containers can adjoin this blow moulding machine 12. This sterilising unit in turn can be adjoined by a filling device 16. However, embodiments of the invention are not limited to these specific working units, and in fact other working units can also be provided, as mentioned above. Transport units, which transport the containers from one working unit to the next working unit are in each case located between the individual working units. In this case it is also possible that the individual working units 12, 14 and 16 are synchronised with one another and for example operate at constant operating speeds.

The reference numeral 20 designates schematically one or more transport devices which transport the containers.

The reference numerals 22, 24 and 26 designate measuring devices which detect measured values from the individual working units 12, 14 and 16. By means of communication connections 32, 34 and 36 these measured values are passed on to the data collection device designated by 4. This data collection device can already decide which of the aforementioned parameters should be further processed in which manner.

The reference numeral 6 designates a data transmission device which, via a secure VPN line 38 and the internet 5, forwards the corresponding data to the data recording device 8. In this case the reference numerals 42 and 44 in each case designate security mechanisms, such as so-called firewalls. The data recording device 8 can likewise decide which data are handled in which manner. Thus, it is possible that several of the data are returned to a machine operator or that corresponding alert stages are triggered. Other data can be passed on to a machine controller 18, which may be for example a member of the machine manufacturer's staff.

The reference numeral 56 designates a selector input device. By means of this selector input device the user can for instance predetermine which criteria are used to transmit data to whom. In the situation illustrated in FIG. 1 the data recording device 8 is situated at the location of the machine manufacturer. Thus, the manufacturer can make these corresponding presets. However, it would also be possible that the data recording device 8 is situated at the location of the machine itself and is for instance integrated in the data collection device. Correspondingly the data selector input device would also be situated at the location of the machine.

The reference numeral 52 designates an information output device which belongs to the plant 10. Information concerning fault conditions can be output to the machine operator B by means of this information output device. A corresponding information output unit 54 can also be situated at the location of the manufacturer 18.

The embodiments now propose that in the region of the data collection device 4 or the data recording device 8 it can be decided which information is handled in which manner or is further processed in which manner. However, such a decision could also be made in both instances, i.e. both in the region of the data collection device and also in the region of the data recording device 8.

Figure 2:
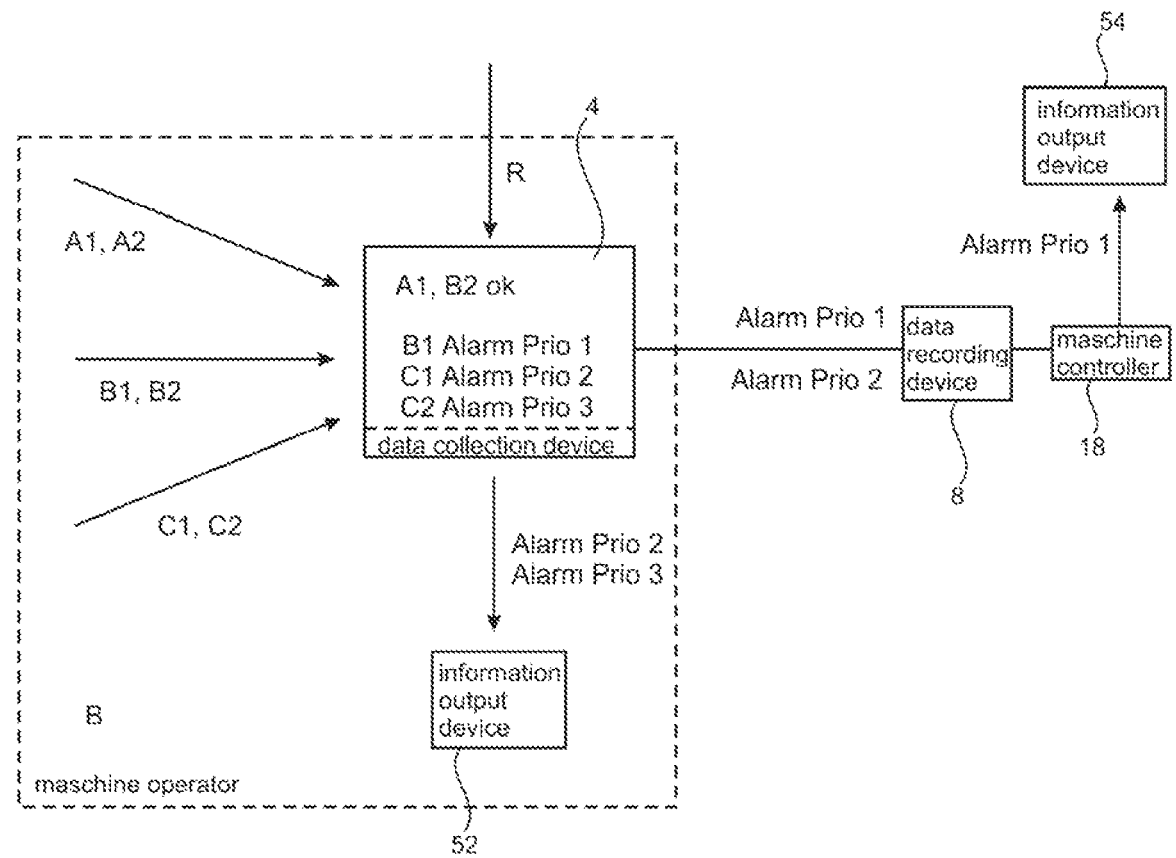
FIG. 2 shows a representation for illustrating the generation of an alert.

FIG. 2 shows a schematic representation for illustration of the method according to embodiments of the invention. Measured values or general values A1, A2, B1, B2 and C1, C2 are transferred to the data collection device 4 by the individual working units (not shown). The values A1 and B2 are in order and no fault is evident. The evaluation of the value B1 reveals that there is a fault with a priority 1. The evaluation of the value C1 reveals that an alert with the priority 2 must have been triggered and the value C2 would lead to an alert with the priority 3. Now due to the user configuration the two alerts priority 2 and priority 3 are passed on to the machine operator and the alert priority 1 is passed on to the machine manufacturer. In addition, the alert priority 2, controlled in terms of escalation and time, is likewise passed on to the data recording device 8. In this way, on the one hand, account can be taken of the interest of the machine user that it does not have to disclose all data and, on the other hand, nevertheless as a function of escalation stages the alert can be passed on to the machine operator or also to the manufacturer. In the region of the detection device 8 storage devices can also be provided which for example store fault conditions and so, where appropriate, allow the processing at a later time.

The evaluation described here of the individual measured or recorded values A1-C2 could also be carried out in the data recording device 8. This can also ensure that specific alerts or data are not output to the machine manufacturer, but only to the machine user B. The reference R designates the predeterminable rules which form the basis for the evaluation of the individual measured values.

Figure 3:
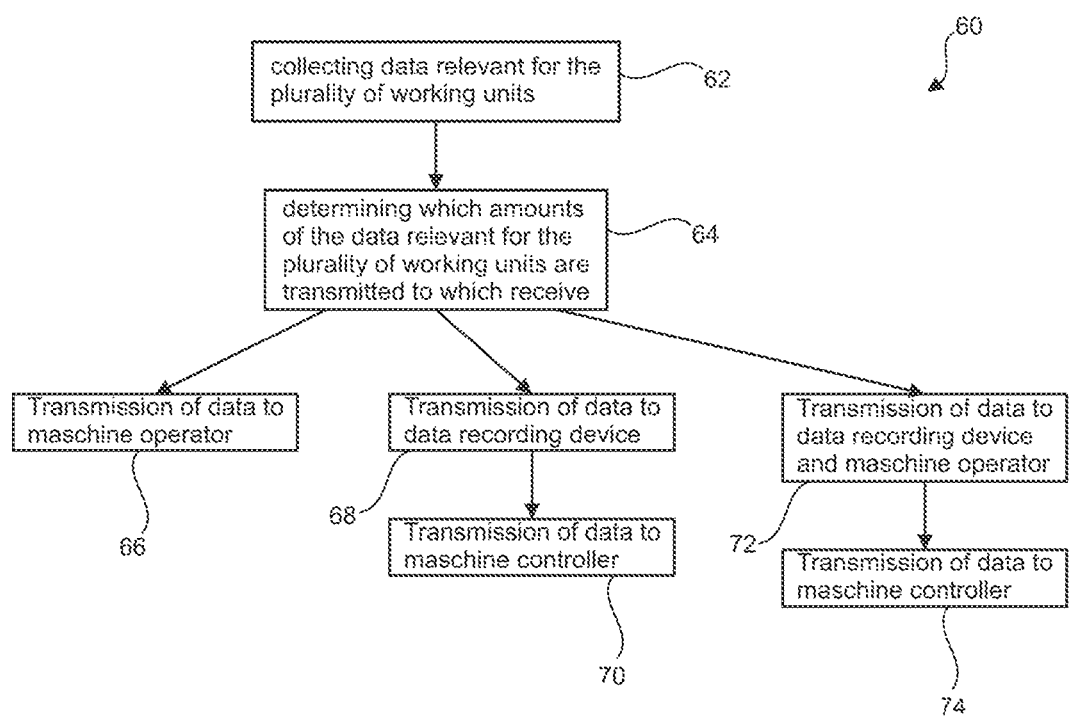
FIG. 3 shows a flowchart of a method according to embodiments of the invention.

FIG. 3 shows a method 60 for remote monitoring of a production plant according to embodiments of the invention. In step 62 the method includes collecting data relevant for the plurality of working units. In step 64 the method includes determining which amounts of the data relevant for the plurality of working units are transmitted to which receiver. In steps 66, 68, and 72 the method includes transmission of data. For example, as shown in step 66 the method may include transmission of data to a machine operator. Alternatively or additionally, the method may include transmission of data to a data recording device as shown in step 68 followed by transmission of data to a machine controller as shown in step 70. Alternatively or additionally, the method may include transmission of data to a data recording device and machine operator as shown in step 72 followed by transmission of data to a machine controller as shown in step 74.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

LIST OF REFERENCES

A1 value
A2 value
B machine operator
B1 value
B2 value

C1 value
C2 value
R rule
1 system/(packaging) plant
4 data collection device/network device
5 internet
6 data transmission device
8 data recording device
10 plant
12 working unit/blow moulding machine
14 working unit
16 working unit/filling device
18 machine controller/manufacturer
22 measuring device
24 measuring device
26 measuring device
32 communication connection
34 communication connection
36 communication connection
38 VPN line
42 security mechanism
44 security mechanism
52 information output device
54 information output device
56 selector input device

The invention claimed is:

1. A method for remote monitoring of a production plant, wherein the production plant is a packaging plant, wherein the packaging plant has a plurality of working units and a data collection device, to which the plurality of working units are connected at least partially and/or intermittently for data transmission, the method comprising:
collecting, by the data collection device data relevant for the plurality of working units;
transmitting, by a data transmission device the data relevant for the plurality of working units from the data collection device to a data recording device, wherein different amounts of the data relevant for the plurality of working units are transmitted to different receivers;
determining, based at least partially on input of a user of the data collection device and/or the data recording device, which amounts of the data relevant for the working units are transmitted to which receiver;
wherein the data transmission device merely transmits a partial amount of the data relevant for the plurality of working units, wherein the partial amount of the data relevant for the plurality of working units can be configured by the user of the data collection device and/or the data recording device, wherein a type and a scope of data to be transmitted to each of the different receivers can be determined by the user of the data collection device and/or the data recording device, and wherein a data selector input device is provided by which the user of the data collection device and/or the data recording device can input the type and the scope of the data to be transmitted to each of the different receivers.

2. The method according to claim 1, wherein the transmission of the data relevant for the plurality of working units from the data collection device to the data recording device takes place via internet.

3. The method according to claim 1, wherein the data collected by the data collection device is stored at least intermittently.

4. The method according to claim 1, wherein at least one amount of collected data is data from at least one working unit measured by measuring devices.

5. The method according to claim 1, wherein the plant is arranged at a first geographical location and the data recording device is at a second geographical location which is different from the first geographical location.

6. The method according to claim 5, wherein an amount of data is output to the first geographical location.

7. The method according to claim 1, wherein the data relevant for the plurality of working units are selected from a group of data which contains raw data, aggregated data, data safeguards, backups, logfiles, fault messages, and alerts.

8. The method according to claim 1, wherein at least one of the plurality of working units is selected from a group of working units which includes transforming devices for transforming plastic parisons into plastic containers, heating devices for heating plastic parisons, sterilising devices for sterilising plastic parisons or plastic bottles, filling devices for filling containers, labelling devices for labelling containers, printing devices for printing containers, and closing devices for closing containers.

9. The method according to claim 1, wherein only specific data are transmitted from the data transmission device to the data recording device and/or only specific data are further processed by the data recording device.

10. The method according to claim 1, wherein the data relevant for the plurality of working units is transmitted to at least two different receivers.

11. The method according to claim 10, wherein the data relevant for the plurality of working units is transmitted in a chronologically staggered manner to the two different receivers.

12. The method according to claim 1, wherein the user of the data collection device and/or the data recording device can determine rules which specify which data are transmitted to which receiver.

13. The method according to claim 1, wherein specific data are filtered out from a data set and data remaining of the data set after filtering are transmitted to one of two receivers and the specific data filtered out are transmitted to the other one of the two receivers.

14. The method according to claim 1, wherein archive copies or backups are created at least intermittently.

15. The method according to claim 1, wherein the data relevant for the plurality of working units are classified or grouped with regard to their relevance or importance for the operation of a machine, wherein the classification takes places taking account of a malfunction to be expected with regard to the data relevant for the plurality of working units.

16. The method according to claim 1, wherein the data relevant for the plurality of working units are repeatedly collected or are collected at predetermined times and/or time windows.

17. A system for remote monitoring of a production plant, wherein the production plant is a packaging plant, and wherein the packaging plant has a plurality of working units as well as a data collection device, to which the plurality of working units are connected at least partially and/or at least intermittently for data transmission, wherein the data collection device is suitable and intended to collect data relevant for the plurality of working units and wherein furthermore a data transmission device is provided to transmit the data relevant for the plurality of working units from the data collection device to a data recording device, wherein different amounts of the data relevant for the plurality of working units can be transmitted to different receivers and a user of the data collection device and/or the data recording device can determine at least partially which of the data relevant for the plurality of working units are transmitted to which receiver, wherein the data transmission device merely transmits a partial amount of the data relevant for the plurality of working units, and wherein the partial amount of the data relevant for the plurality of working units can be configured by the user of the data collection device and/or the data recording device, wherein a type and a scope of data to be transmitted to each of the different receivers can be determined by the user of the data collection device and/or the data recording device, and wherein a data selector input device is provided by which the user of the data collection device and/or the data recording device can input the type and the scope of the data to be transmitted to each of the different receivers.

18. The system according to claim 17, wherein the system has a data grouping device by which incoming data at the data collection device are allocated to different groups of data.

19. The system according to claim 18, wherein an analysis device is provided, which analyses the incoming data as to whether the incoming data are based on conditions of the working units which can give rise to a specific fault of the plant, wherein the different groups of data can be transmitted to different receivers.

* * * * *